United States Patent [19]

Priefert

[11] 4,048,961
[45] Sept. 20, 1977

[54] SQUEEZE BAR STRUCTURE FOR A CATTLE CHUTE

[75] Inventor: William D. Priefert, Mount Pleasant, Tex.

[73] Assignee: Priefert Mfg. Co., Mount Pleasant, Tex.

[21] Appl. No.: 705,143

[22] Filed: July 14, 1976

[51] Int. Cl.² ............................................. A01K 29/00
[52] U.S. Cl. .......................................... 119/96; 119/99
[58] Field of Search ...................... 119/96, 98, 99, 100, 119/103, 27

[56] References Cited

U.S. PATENT DOCUMENTS

| | | | |
|---|---|---|---|
| 2,660,982 | 12/1953 | Linton | 119/98 |
| 2,957,451 | 10/1960 | Brockman | 119/96 |
| 3,024,766 | 3/1962 | Eveland | 119/96 |

Primary Examiner—Hugh R. Chamblee
Attorney, Agent, or Firm—Rudolph L. Lowell

[57] ABSTRACT

The animal squeeze structure for a cattle chute having a base frame and a pair of transversely opposite side panels is supported between and intermediate the ends of the panels and includes an upright squeeze bar movable toward and away from one panel to squeeze an animal between the bar and the opposite panel. The squeeze bar is radially offset from and pivotable about a vertical axis to swing from an open position adjacent the one panel to an operative position spaced from the one panel and against the adjacent side of an animal in the chute. Means are provided for releasably locking the squeeze bar in its operative position.

11 Claims, 9 Drawing Figures

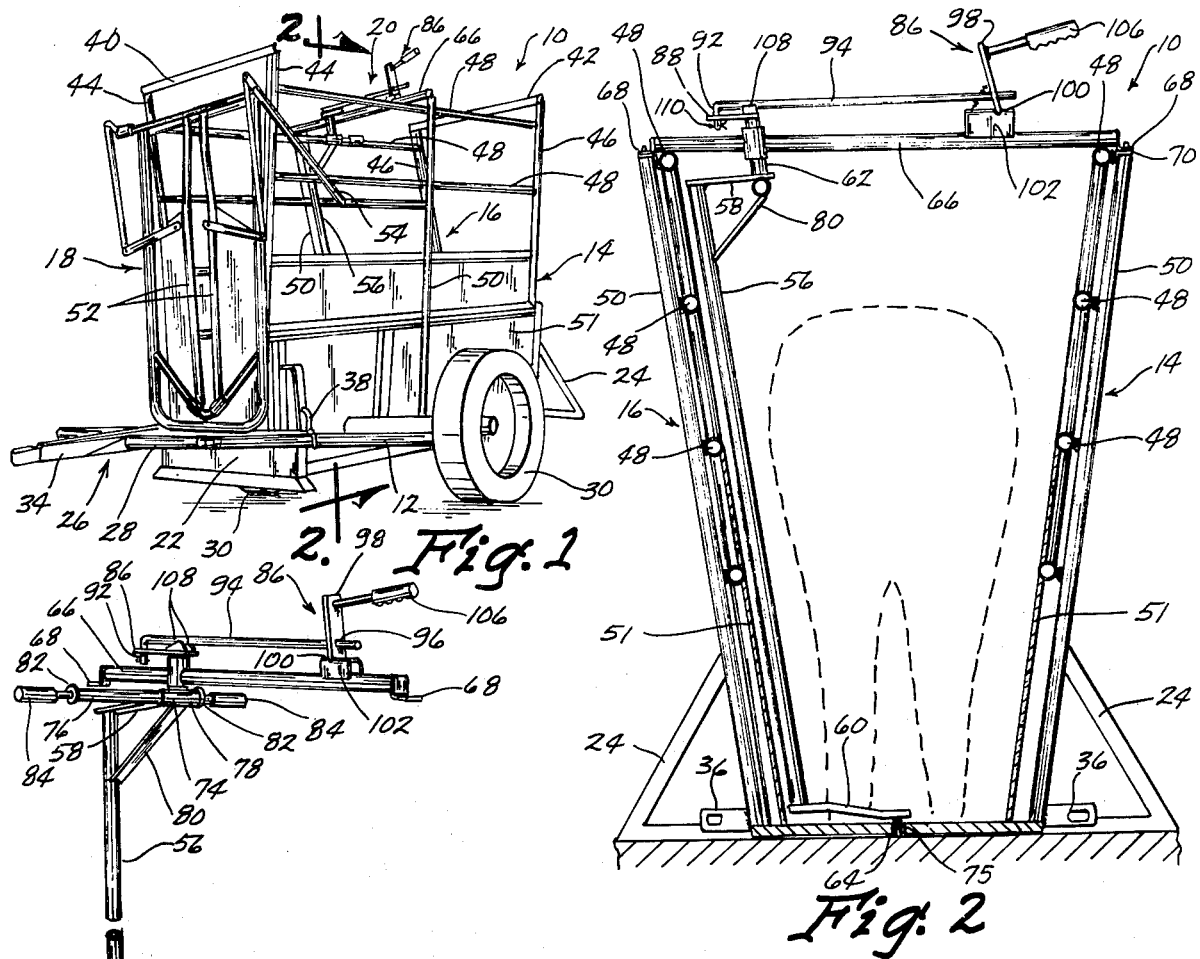
Fig. 1
Fig. 2
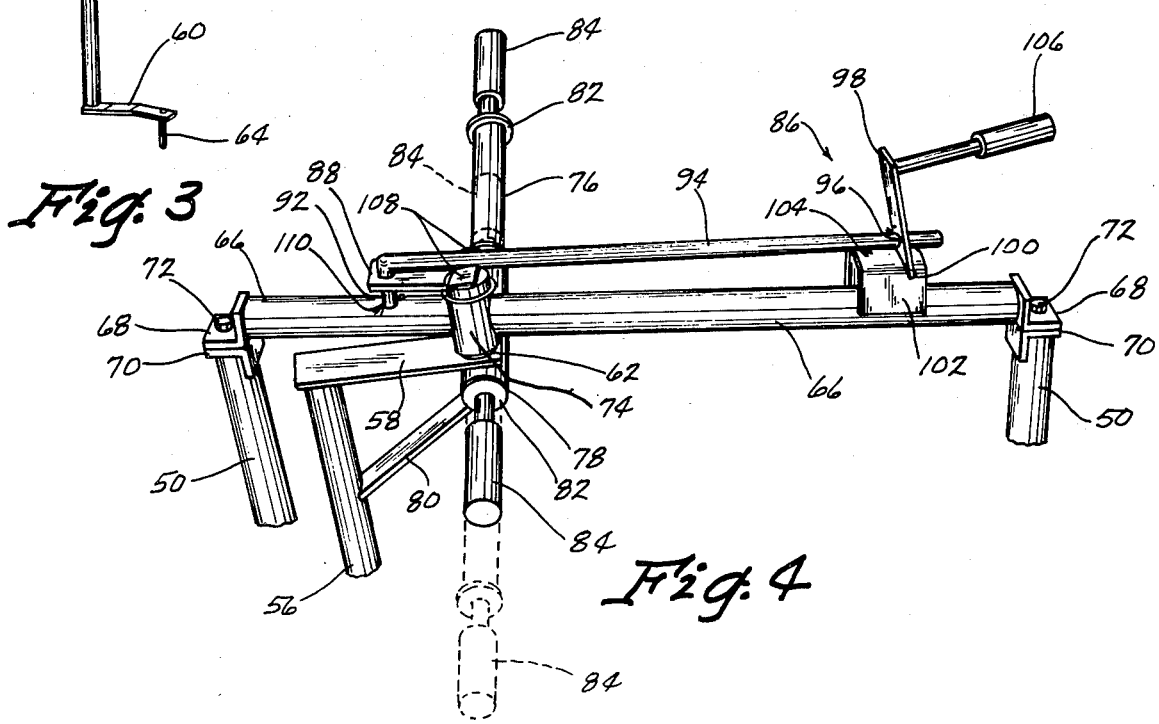
Fig. 3
Fig. 4

4,048,961

SQUEEZE BAR STRUCTURE FOR A CATTLE CHUTE

SUMMARY OF THE INVENTION

The squeeze structure is readily installed on a cattle chute, is efficient in operation and is adapted to secure an animal in a minimum time for branding or medicinal purposes. The squeeze bar is pivotably movable laterally of the chute to adjusted positions to accommodate animals of different sizes. Furthermore, the entire squeeze structure is reversible thereby enabling it to be assembled on the chute for operation from either side of the chute. Exposure of the animal being held in the chute is at a maximum since only the single squeeze bar contacts one side of the animal. The single line of contact between the squeeze bar and midsection of an animal effectively eliminates potentially harmful pressure against the hips and shoulders of the animal. Since the squeeze bar can be releasably locked at any operative position, the pressure applied by the bar against the animal can be varied. Automatically locking the squeeze bar in its open position prevents the bar from accidently swinging into the chute so as to injure an animal entering or exiting from the chute.

BRIEF DESCRIPTION OF THE DRAWINGS

FIG. 1 is a front perspective view of a cattle chute in a transport position showing the squeeze structure of this invention in assembly relation therewith;

FIG. 2 is an enlarged transverse sectional view as seen on line 2—2 in FIG. 1 with the chute lowered and the squeeze structure in a rest position;

FIG. 3 is a reduced perspective view of the squeeze structure;

FIG. 4 is an enlarged fragmentary top perspective view of the squeeze structure;

DESCRIPTION OF THE INVENTION

Figure 5:
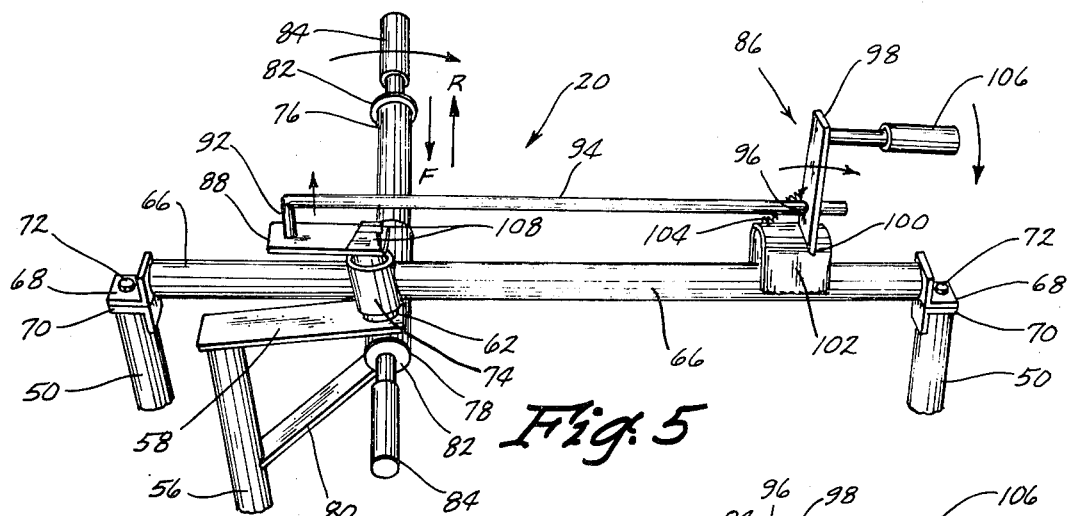
FIG. 5, illustrated similarly to FIG. 4, shows a releasable lock means in position to release the squeeze bar.

With reference to the drawing, an animal chute, designated generally at 10 in FIGS. 1 and 2, is illustrated as including a base frame 12, a pair of transversely spaced upright side panels 14 and 16 mounted on the base frame, and an animal holding gate structure 18 connected between the side panels at the front end of the chute. The squeeze of this invention is designated generally at 20. The animal chute 10 is provided with front and rear outrigger structures 22 and 24 for stabilizing the chute in its ground supported position shown in FIG. 2.

For transport between working locations, the squeeze chute 10 is removably mounted on a chute trailer, designated generally at 26 in FIG. 1, which includes a tubular U-shaped frame 28 having wheels 30, only one of which is illustrated, rotatably supported at both free ends of the frame 28. A tongue 34 is extended in a forward direction from the center of the frame 28 for attachment to a towing vehicle. To support the rear end of the chute 10 on the trailer 26, suitable brackets 36 (FIG. 2) extend transversely from opposite sides of the base frame 12 for attachment to the free ends of frame 28 by suitable fastening means. The front end of the chute 10 is supported on the trailer 26 by brackets 38 on opposite sides of the chute which are engageable with forward portions of the trailer frame 28. For a more detailed description of the chute trailer 26, reference is made to U.S. Pat. No. 3,945,661. After the chute 10 has been towed to a working location, the trailer 26 is removed so that the base frame 12 can rest directly on the ground as shown in FIG. 2.

The side panels 14 and 16, which diverge upwardly and outwardly from opposite sides of the base frame 12, are connected at their upper ends by front and rear cross members 40 and 42, respectively. Each side panel 14 and 16 is a tubular framework consisting of front and rear upright end posts 44 and 46 connected together by vertically spaced longitudinal side members 48. An additional upright post 50 is fastened to the side members 48 at a generally centered position longitudinally of the chute for supporting the squeeze structure 20 of the present invention, as will be described in further detail below. A lower inside portion of each side panel 14 and 16 may be covered with a sheet metal or wood panel 51 to provide a clear passageway for the animals and to protect bystanders.

Extended between the side panels 14 and 16 across the front of the cattle chute 10 is the animal holding gate structure 18 having neck engaging members 52 which are movable by a manually operated leaver 54 toward and away from each other into and out of engagement with opposite side portions of the neck of an animal to be restrained within the chute 10. For a more detailed description of the gate structure 18, reference is made to U.S. Pat. No. 3,623,456.

The squeeze structure 20 of the present invention (FIGS. 2 and 3) includes an upright squeeze bar 56 supported at a position between and intermediate the ends of the side panels 14 and 16 for movement transversely of the chute toward and away from side panel 16. Affixed to and radially extended from upper and lower ends of the squeeze bar 56, respectively, and in a common vertical plane are an upper arm 58 and a lower arm 60. A short upright stub shaft 62 (FIG. 2) extends upwardly from the free end of upper arm 58 and a short stub shaft extends downwardly from the free end of lower arm 60 for pivoting the squeeze bar 56 about an axis extended through the stub shafts 62 and 64.

To position the upper pivot or stub shaft 62 relative to side panel 16, a transverse upper cross member 66 (FIG. 4) is provided having channel shaped end flanges 68 at its opposite ends adapted for attachment to similar flanges 70 on the tops of the side panel center posts 50, such as by bolts 72.

Interposed along the cross member 66 is an upper bearing sleeve 74 (FIG. 4) for pivotally receiving the upper stub shaft 62. The lower pivot or stub shaft 64 on lower arm 60 is pivotally received within a hole 75 formed in the base frame 12 below the upper cross member 66. Thus, upper stub shaft 62 and lower stub shaft 64 coact to pivotally support the squeeze bar 56 for movement from an open position adjacent to and generally parallel with side panel 16 to an operative position spaced inwardly from panel 16 to engage the adjacent side of an animal in the chute.

To pivotally move the squeeze bar 56 relative to stub shafts 62 and 64, a manually operated handle 76 (FIG. 4) is connected to the upper arm 58 at a position below cross member 66. Handle 76 is slidably received within a generally horizontal sleeve 78 fastened to the under side of upper arm 58 so as to be below the upper stub shaft 62 and perpendicular to the upper arm 58. The sleeve 78 is secured in position by a lower brace 80 connected between the sleeve 78 and squeeze bar 56. Handle 76 has a collar 82 adjacent each of its ends of sufficient diameter to prevent withdrawal of the handle from sleeve 78. Each end of the handle 76 carries a handgrip 84. It can be seen in FIG. 4 that when the squeeze bar is in its open position adjacent side panel 16, handle 76 extends longitudinally of the chute and may be moved between positions therefor shown in solid and dotted lines.

Figure 6:
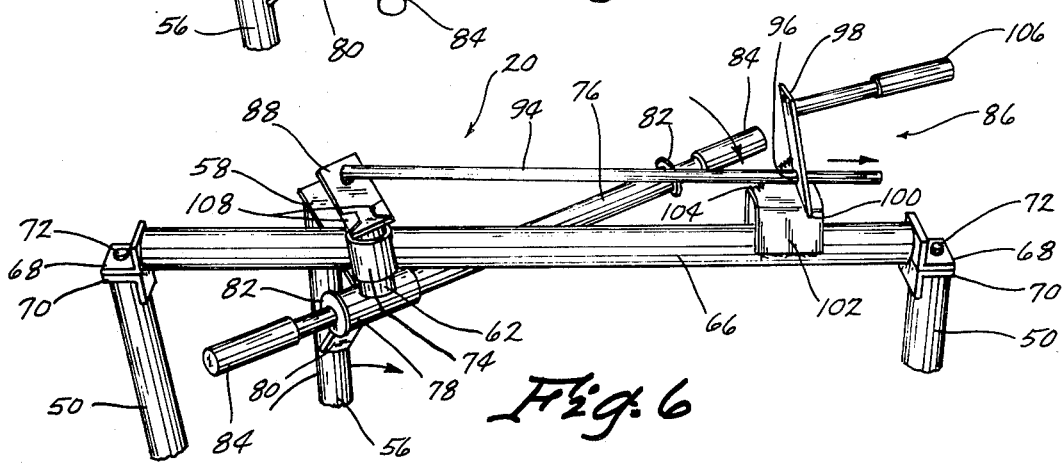
FIG. 6 is illustrated similarly to FIG. 4 and shows the squeeze bar pivotally moved to an operative position.

Referring to FIG. 5, it will be seen that when the handle is moved to its rear position in the direction of arrow R, and pulled across the chute as indicated in FIG. 6, the squeeze bar is pivoted clockwise about its stub shafts rearwardly and across the chute 10. Similarly, if the handle 76 is moved to its forward position, in the direction of arrow F, and pulled across the chute, the squeeze bar 56 is pivoted counterclockwise forward and across the chute. Since the handle 76 is slidable within the sleeve 78, interference between the handle 76 and upright post 50 of the side panel 16 is easily avoided by simply sliding the handle inwardly of the side panel as indicated in FIG. 6. The slidability of the handle 76 also provides accessibility to an operator positioned either forwardly or rearwardy of the squeeze structure.

As thus far described, it is seen that an animal is directed into the open rear end of the chute 10 when the front gate structure 18 is open. When the head of the animal extends through the gate 18, the neck engaging members 52 are moved into neck engaging positions by the manual actuation of the lever 54 (FIG. 1). The animal is thus restrained against fore and aft movement. To hold the animal in the chutes, one end of handle 76 is pulled across the chute 10 thereby pivotally moving the squeeze bar 56 transversely of the chute to press the animal against the opposite side panel 14. The squeeze bar is then locked in its engaged position against the animal in order to free the operator to perform all necessary treatment on the animal.

For this purpose, a releasable lock structure, designated generally at 86 in FIG. 5 is provided for locking the squeeze bar 56 in an operative position. The lock structure 86 includes a rock arm 88 connected to the upper stub shaft 62 for rotation therewith in response to pivotal movement of the squeeze bar 56. To automatically lock the squeeze bar 56 in the operative or squeezing position therefor, there is pivotally connected to the free end of rock arm 88 the bent end portion 92 of a locking rod 4 (FIG. 5), the other end of which is guidably movable through an opening 96 formed in a pivoted plate member 98. The pivot connection of plate member 98 comprises the insertion of the lower end of plate 98 within an opening 100 in the top surface of a latch mechanism bracket 102 that is carried on the cross member 66. Plate 98, which is pivotally movable back and forth in the bracket 102, is continuously urged by a spring 104 in a direction to frictionally engage the locking rod 94 To release the rod 94, the plate 98 is pivotally moved against the action of the spring 104 by actuation of a handle 106 thereon.

It is seen, therefore, that when the locking rod 94 is moved across the chute (to the right in FIG. 4) in response to pivotal movement of squeeze bar 56, plate 98 is automatically pivoted therewith to a generally vertical position to permit a relative sliding movement between the rod 94 and the plate 98. However, when the squeeze bar has been moved to an operative position against an animal, the force of the animal pushing the squeeze bar back outwardly toward side panel 16 tends to move the locking rod 94 in the same direction. Plate 98, under the urging of spring 104, is pivotally moved by rod 94 into binding engagement therewith at the opening 96 whereby to positively hold the squeeze bar in an operative position.

In order to release the latch mechanism 90 to move the squeeze bar 56 to its open position, it is only necessary to manually pull down on the handle 106 thereby pivoting plate 98 against the action of spring 104. Thus there is provided a releasable latching mechanism for positively locking the squeeze bar 56 in an adjusted operative position.

To prevent the squeeze bar 56 from interfering with the entrance or exit of an animal from the chute 10, the squeeze bar is locked in its outermost open position adjacent panel 16. For this purpose, a releasable means for retaining the squeeze bar in its open position includes upright abutment means on the rock arm 88 for engaging the locking rod 94 when it attains a position parallel to the rock arm corresponding to the open position of the squeeze bar 56. In FIG. 6, the abutment means are shown as a pair of upwardly converging ribs or flanges 108 which are spaced apart sufficiently to receive the locking bar 94 between them. Thus, as the rock arm 88 is pivoted outwardly to a position corresponding to the open position of the squeeze bar 56, the locking rod 94 is automatically lifted on the inclined outer surface of one of the flanges 108 until it falls between the flanges thereby preventing further rotation of rock arm 88 and squeeze bar 56. To release rod 94 for movement of the squeeze bar 56 from its open position, it is only necessary to pull down on the handle 106 of the lock structure 86 thereby lifting the end of the locking rod 94 upwardly out from between the flanges 108. A cotter pin 110 (FIG. 4) through the free end of the bent end portion 92 prevents the total withdrawal of the bent end portion from rock arm 88. With the locking rod 94 raised, handle 76 is pulled slightly to displace the locking rod longitudinally of the chute thereby preventing it from again falling between the flanges 108. Thus, the flanges 108 cooperate with the latch mechanism 90 to releasably retain the squeeze bar in its open position.

To squeeze an animal in the chute, therefore, an operator need only pull downward on the handle 106, as indicated in FIG. 5, to lift the locking rod 94 clear of the ribs 108 and to pull handle 76 toward him to pivotally move the squeeze bar transversely of the chute into the adjacent side of an animal in the chute. Handle 106 may be released as soon as the squeeze bar 56 is moved from its open position. The pressure of the squeeze bar against the animal can be regulated simply by the degree to which the squeeze bar is pivotally moved into or against the animal. To lock the squeeze bar in its operative position, the operator need only let go of handle 76 and the lock structure 86 will automatically effect the locking of the squeeze bar in that position.

Figures 7, 8, 9:
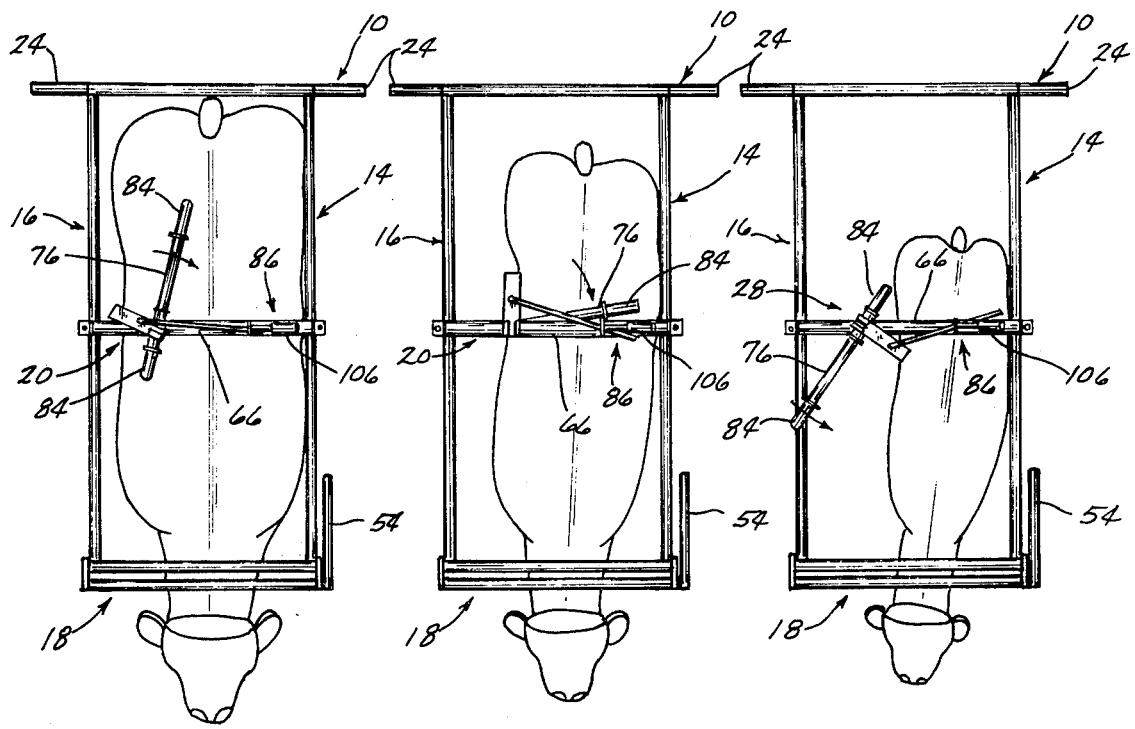
FIG. 7 is a plan diagrammatic view of the cattle chute showing the squeeze bar in its operative position for holding a large animal in the chute.
FIG. 8 is a plan diagrammatic view of the cattle chute showing the squeeze bar in operative position for holding a medium size animal in the chute.
FIG. 9 is a plan diagrammatic view of the cattle chute showing the squeeze bar in operative position for holding a small animal in the chute.

Referring to FIGS. 7-9, it will be seen that the squeeze structure 20 is operable for engaging both large and small animals in a squeezed position for treatment.

The squeeze structure 20 of the present invention is easily adaptable for providing access to either side of an animal in the chute by simply removing the bolts 72 and turning the upper cross member 66 end to end. Since the hole 75 in the base frame 12 is transversely centered on the base frame, no repositioning of the lower stub shaft 64 is necessary for such a reversal of the squeeze structure.

Although the invention has been described with respect to a preferred embodiment thereof, it is to be understood that it is not to be so limited since changes and modifications can be made therein which are within the full intended scope of this invention as defined by the appended claims.

I claim:

1. An animal squeeze structure for a cattle chute comprising a base frame and a pair of transversely spaced longitudinally extended upright side panels mounted on said base frame having forward and rearward ends, said squeeze structure including:
    a. an upright squeeze bar located between and intermediate the ends of said panels, and
    b. means on said side panels and base frame supporting said squeeze bar for swingable movement transversely of the chute toward and away from one of said panels about an upright axis situated inwardly from said one panel, said squeeze bar, from a rest position adjacent said one panel, being swingable to a first operative position located forwardly of the upright axis and spaced inwardly from said one panel and swingable rearwardly to a second operative position located rearwardly of the upright axis and spaced inwardly from said one panel.

2. An animal squeeze structure, according to claim 1, wherein:
    a. said means for movably supporting said squeeze bar includes manually operated means connected to said squeeze bar for moving said squeeze bar transversely of the chute, and
    b. means for releasably locking the squeeze bar in a transversely moved position.

3. An animal squeeze structure, according to claim 1, wherein:
    a. said means for supporting said squeeze bar includes a transverse upper cross member having opposite ends fastened to respective side panels, and
    b. said upright axis extended through said upper cross member.

4. An animal squeeze structure, according to claim 1, including:
    a. means for pivotally moving the squeeze bar through a complete revolution about the upright axis.

5. An animal squeeze structure for a cattle chute comprising a base frame and a pair of transversely spaced longitudinally extended upright side panels mounted on said base frame, said squeeze structure including:
    a. an upright squeeze bar located between and intermediate the ends of said panels adjacent one of said panels, and
    b. means on said side panels and base frame movably supporting said squeeze bar for movement transversely of the chute toward and away from said one panel,
    c. said means for movably supporting said squeeze bar including manually operated means connected to said squeeze bar for moving said squeeze bar transversely of the chute,
    d. means for releasably locking the squeeze bar in a transversely moved position,
    e. an upper arm connected to and laterally extended from one end of the squeeze bar,
    f. a lower arm connected to and laterally extended from the opposite end of the squeeze bar, said upper and lower lateral arms extended radially from the squeeze bar in a common vertical plane,
    g. a transverse upper cross member having opposite ends fastened to respective side panels, and
    h. first coacting means on the upper cross bar and upper lateral arm and second coacting means on the base frame and lower lateral arm for pivotally supporting the squeeze bar for movement from an open position adjacent to and generally parallel with said one panel to an operative position spaced inwardly from said one panel.

6. An animal squeeze structure for a cattle chute, according to claim 5, wherein:
    a. said first coacting means includes an upright shaft adjacent the terminal end of the upper lateral arm and bearing means on the upper cross member for rotatably supporting said shaft.

7. An animal squeeze structure for a cattle chute, according to claim 6, wherein:
    a. said second coacting means includes an upright shaft adjacent the terminal end of the lower lateral arm and bearing means on the base frame for rotatably supporting said last mentioned shaft.

8. An animal squeeze structure for a cattle chute, according to claim 5, wherein:
    a. said means for releasably locking the squeeze bar in a transversely moved position comprises a rock arm on said first coacting means rotatable in response to pivotal movement of the squeeze bar, and means on said upper cross member connected to said rock arm for releasably locking the squeeze bar against pivotal movement toward said one panel.

9. An animal squeeze structure for a cattle chute, according to claim 8, wherein:
    a. said means on said upper cross member comprises a locking rod pivotally connected at one end thereof to said rock arm,
    b. a pivoted latch mechanism on said upper aross bar having a portion in guidable engagement with said locking rod, and
    c. said latch mechanism, when pivotally moved in one direction by said rod, providing for the axial movement of said rod relative to said guide portion and, when pivotally moved in an opposite direction by said rod, providing for a binding engagement of said guide portion with the rod.

10. An animal squeeze structure for a cattle chute, according to claim 9, further comprising:
    a. means for releasably retaining the squeeze bar in its open position, including upright abutment means on the rock arm for receiving the locking rod when the squeeze bar is in its open position.

11. An animal squeeze structure for a cattle chute, according to claim 5, wherein:
    a. said manually operated means comprising a sleeve and handle assembly including a generally horizontally extended sleeve connected to said upper arm, and
    b. an elongated handle supported in and slidable axially of said sleeve,
    c. said squeeze bar being pivotally movable in response to rotation of said sleeve and handle assembly.

* * * * *